United States Patent [19]
Hara et al.

[11] 3,875,437
[45] Apr. 1, 1975

[54] VARIABLE RELUCTANCE TYPE STEP MOTOR

[75] Inventors: Hiroshi Hara, Ibaraki-ken; Kazuo Onishi, Hitachi, both of Japan

[73] Assignee: Hitachi, Ltd., Tokyo, Japan

[22] Filed: Dec. 26, 1973

[21] Appl. No.: 428,007

[30] Foreign Application Priority Data
Dec. 27, 1972 Japan............................ 47-129959

[52] U.S. Cl. .................................................. 310/49
[51] Int. Cl. ............................................ H02k 37/00
[58] Field of Search............ 310/49, 49 A, 162–164; 318/685, 138, 259

[56] References Cited
UNITED STATES PATENTS
3,385,984   5/1968   O'Regan .............................. 310/49
3,509,392   4/1970   Snowdon ............................. 310/49
3,774,059  11/1973   Cox .................................... 310/49

Primary Examiner—Donovan F. Duggan
Attorney, Agent, or Firm—Craig & Antonelli

[57] ABSTRACT

A variable reluctance type step motor is disclosed which comprises a rotor core having teeth, a stator core having a plurality of magnetic poles arranged thereon opposing to the teeth of the rotor core, each of the magnetic poles being wound with an exciting winding and being provided with stator teeth on the surface thereof opposing to the rotor teeth in the number of the rotor teeth, wherein the stator teeth are pulse excited in a predetermined phase sequence thereby to change the relative position of the stator teeth to the rotor teeth by a predetermined amount, so that each time of application of a pulse to the exciting windings, the rotor is rotated by one step in the direction determined by the sequence of excitation.

7 Claims, 4 Drawing Figures

VARIABLE RELUCTANCE TYPE STEP MOTOR

FIELD OF THE INVENTION

This invention relates to an improvement on a step motor.

SUMMARY OF THE INVENTION

Among the conventional types of step motor wherein, while changing the positional relationship between the uniformly distributed rotor teeth and stator teeth by regular amounts, the stator teeth are pulse excited to effect stepped rotation in phase sequence, there is one called the variable reluctance type step motor in which the numbers of the stator and rotor teeth are differentiated in order to achieve different positional relationships between the stator and rotor teeth for each phase.

A main feature of the step motor resides in the fact that the rotor of the motor is driven in response to electrical instructions in the form of impulses by the amount corresponding to the number of the pulses and in such a direction as determined by the sequence of the excitation.

Each time of arrival of pulses, the rotor is rotated in the forward or reverse direction by the angle corresponding to the number of the pulses, and the turning effort is imparted to external equipment by the agency of an appropriate transmission system.

In such a type of step motor, the desired functions of the motor make it necessary to differentiate the number of rotor teeth from that of stator teeth. If the number of steps per rotation of the rotor is to be increased, the teeth of both the stator and rotor may be increased in number. However, in view of the fact that exciting windings are wound on the stator, it is not desirable to increase the number of the magnetic poles of the stator from the standpoint of manufacturing processes, the only alternative being to increase the number of the rotor teeth.

It is known to provide a variable reluctance type step motor in which the number of steps is increased by increasing the number of rotor teeth without increasing the number of magnetic poles with grouping the stator teeth which belong to the same phase.

An object of the invention is to provide a variable reluctance type step motor in which an increased number of combinations of the respective numbers of stator and rotor teeth is attained by selecting the order of arrangement of the exciting windings wound on the magnetic poles without regard to the order of excitation phases.

Another object of the invention is to provide a variable reluctance type step motor advantageous both in manufacture and operation by maximizing the number of available steps, each having a step angle of an aliquot decimal, to achieve improved design freedom.

The main feature of the invention resides in the fact that in a step motor comprising a plurality of magnetic poles each wound with an exciting winding and arranged opposing to rotor teeth formed at the periphery of a rotor core, and stator teeth being integrally provided on the magnetic poles opposing to the rotor teeth, the order of arrangement of the magnetic poles for each phase is made different from the order of the excitation phase of the exciting windings.

BRIEF DESCRIPTION OF THE SEVERAL VIWES OF THE DRAWING

DETAILED DESCRIPTION

Description of the Prior Art

Figure 1:
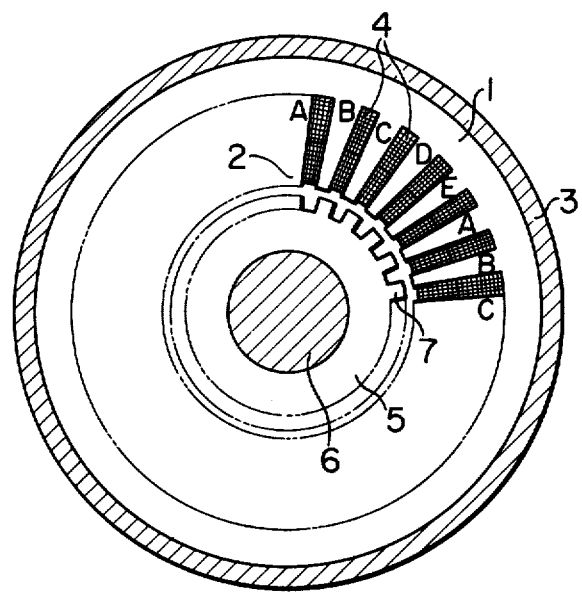
FIG. 1 is a partly exploded longitudinal front view showing a conventional step motor.

The conventional step motor of variable reluctance type will be explained below with reference to FIG. 1.

Reference numeral 1 represents a stator core comprising a lamination of punched steel plates with a multiplicity of stator teeth 2 along the inner periphery thereof, the outer periphery thereof being fastened to a housing 3. Numeral 4 represents exciting windings each arranged in two layers in a slot between each adjacent two stator teeth. Numeral 5 represents a rotor core mounted on a rotary shaft 6, which rotor core has on its outer periphery rotor teeth 7 in a number in a predetermined relationship with that of the stator teeth.

The above-described conventional motor is characterized by the ease with which the stator core, like those of general rotary electric machines, can be produced by forming a multiplicity of punched steel plates into a laminated structure. The disadvantage of this conventional motor, on the other hand, lies in the fact that since the stator teeth 2 are distributed on the same circumference with the exciting winding 4 mounted between each two adjacent stator teeth, requires a large space for accomodating the exciting winding every tooth.

The resulting necessity for securing the space for accomodating the exciting windings is accompanied by an excessively great ratio of the slot depth to the tooth width, thereby causing a drop in magnetic potential and increased magnetic flux leakage within the rotor teeth 2, resulting in a disadvantage of the reduction of the motor efficiency. In addition to these disadvantages, an increased rotor diameter is required because of the need to secure an increased slot width, thus making difficult the reduction of inertia which is required for improved dynamic characteristics of the rotor.

Figure 2:
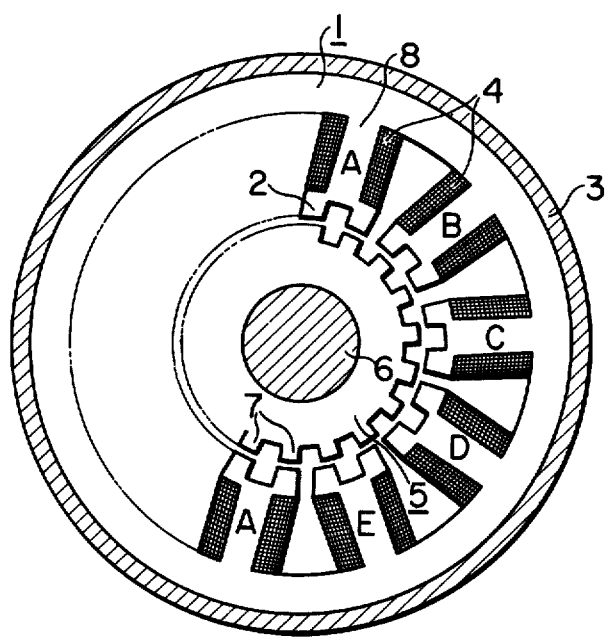
FIG. 2 is a partly exploded longitudinal front view showing an improved conventional step motor.

In order to obviate these disadvantages, there is an improved motor in which those of the stator teeth 2 belonging to the same phase are grouped. Referring to FIG. 2, a magnetic pole 8 for each phase is formed integrally with a stator core 1 fixed on a housing 3, which magnetic pole 8 has on its inner periphery stator teeth 2 formed opposing to rotor teeth 7 of a rotor core 5.

The magnetic poles 8 are arranged in order of excitation thereof for example in the order of A, B, C, D and E as shown in the drawings, and the stator teeth 2 for each phase are arranged in every magnetic pole 8 so that the combinations of the numbers of stator teeth 2 and rotor teeth 7 are required to meet the following condition:

-Continued $$n \frac{2\pi}{Nr} - \frac{2\pi}{mP} = \frac{\pm 2\pi}{-mNr} \quad \ldots (1)$$

that is, $$P(mn \pm 1) = Nr \ldots \quad (2)$$

where Nr is the number of rotor teeth, $m$ the number of phases, P the number of magnetic poles for each phase, each pole having concentrated stator teeth of the same phase, and $n$ a given integral number equal to the maximum possible number of stator teeth for each pole for each phase.

Table 1 below shows the relationship between the step angle and the combinations of the numbers of rotor and stator teeth which satisfies equation (1) in the hypothetical case of half step drive excitation employing 5 phases and 2 poles for each phase, in the conventional step motor.

Table 1

|   |   | (5 Phases) |   |
|---|---|---|---|
| $n$ | Number of Stator Teeth Ns | Number of Rotor Teeth Nr | Step Angle $\theta_0$ |
| 1 | 2 | 20 | 18 | 2° |
| 2 | 2 | 20 | 22 | 1.6363° |
| 3 | 3 | 30 | 28 | 1.2857° |
| 4 | 3 | 30 | 32 | 1.125° |

Practical application of the motor, however, preferably requires a step angle $\theta_0$ of an aliquot decimal, and therefore only the step angles of 2° and 1.125° in Table 1 are practicable ones, thus imposing heavy restrictions on manufacturing freedom.

DESCRIPTION OF THE PREFERRED EMBODIMENT

Figure 3:
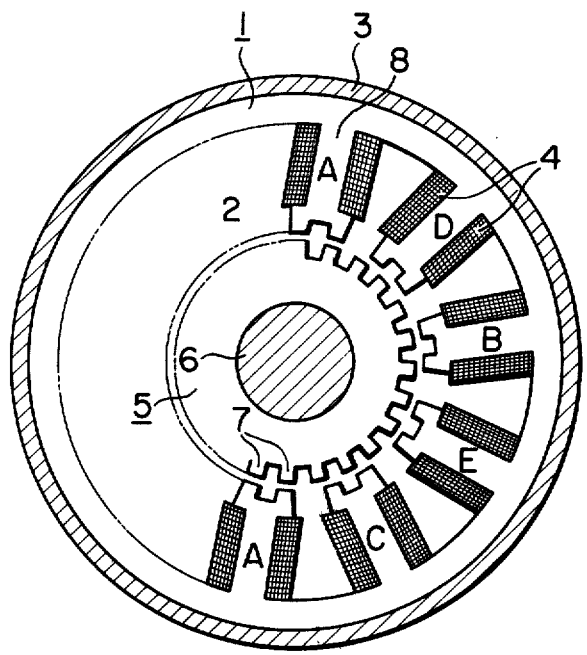
FIG. 3 is a partly exploded longitudinal front view showing an embodiment of the step motor according to the present invention.

In FIG. 3 showing an embodiment of the present invention, a stator core 1 is fixed on a housing 3 and has magnetic poles 8 along the inner periphery thereof opposing to a rotor core 5. The magnetic poles 8 are provided with stator teeth 2 on the inner periphery thereof opposing to rotor teeth 7 provided on the outer periphery of the rotor 5, so that the magnetic poles 8 are pulse excited sequentially by means of 5-phase exciting windings 4.

Figure 4:
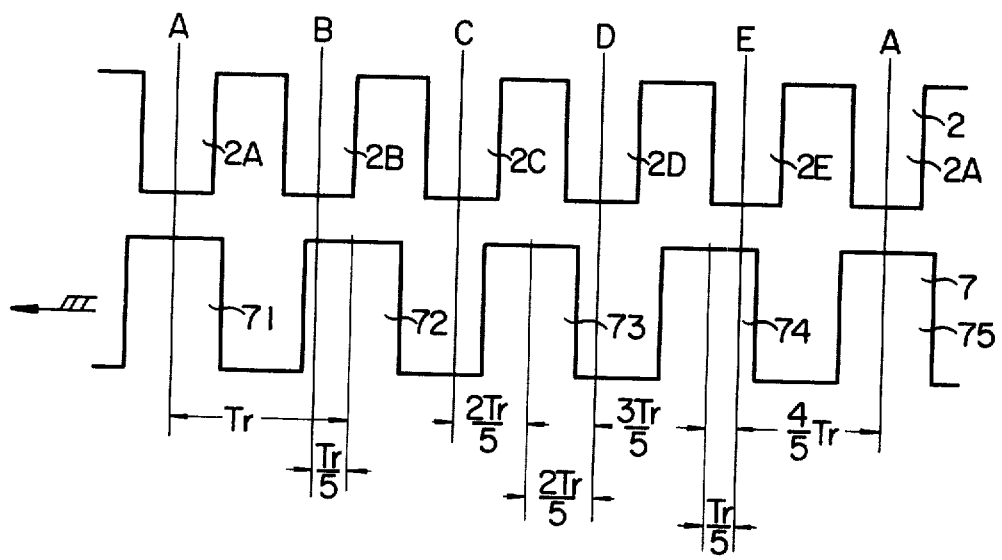
FIG. 4 is an expansion plan of the variable reluctance step motor.

The relationship between the stator teeth 2 wound with the 5-phase exciting windings 8 and the rotor teeth 7 disposed opposing to the stator teeth 2 is shown in FIG. 4, in which only one tooth is shown for each pole to facilitate the understanding.

Assuming that the phase A of stator teeth is in the process of being excited, the rotor moves in the direction of the arrow to such a position where the center of magnetic pole of the rotor tooth 71 coincides with that of the stator tooth 2A as shown.

In this stable state, the rotor tooth 72 opposing to the stator tooth 2B of phase B has the center of the magnetic pole thereof lagging behind that of stator tooth 2B by one fifth the tooth pitch Tr. Also, the center of magnetic pole of rotor tooth 73 of phase C is behind that of stator tooth 2C opposing thereto by 2/5Tr. In like manner, the rotor tooth 74 of phase D lags behind the stator tooth 2D by 3/5Tr. Further, the rotor tooth 75 which is lagging behind the stator tooth 2E of phase E by 4/5Tr is in phase with the next stator tooth 2A of phase A.

In other words, the rotor tooth 74 is in advance of the stator tooth 2E of phase E by 1/5Tr, and the rotor tooth 73 in advance of the stator tooth 2D of phase D by 2/5Tr.

Phase-B excitation under this condition causes the rotor to move in the direction of arrow by 1/5Tr and stops at the position where the center line of magnetic pole of the stator tooth 2B of phase B coincides with that of the rotor tooth 72. Under this condition, the maximum phase difference between stator teeth 2 and rotor teeth 7 is 2/5Tr.

For this reason, even if the order in which the stator teeth 2 of respective phases are arranged does not coincide with the order of excitation phase, the rotor can be rotated by one step by satisfying the above-mentioned condition.

To achieve this purpose, the equation that must be satisfied is $$n \frac{2\pi}{Nr} - \frac{2\pi}{mP} = \pm k \cdot \frac{2\pi}{mNr} \quad \ldots (3)$$

that is $$P(mn \pm k) = Nr \ldots \quad (4)$$

where Nr is the number of rotor teeth, $m$ the number of phases, P the number of poles for each phase, each pole being provided with concentrated stator teeth of the same phase, and $n$ and $k$ given integral numbers. The pitch Tr of rotor teeth 7 is given by $2\pi/Nr$ and the step angle $\theta$ of the rotor by $2\pi/mNr$.

Accordingly, the practically available combinations of the numbers of rotor and stator teeth of a 5-phase 2-pole step motor which satisfies the equation (3) given above are as shown in Table 2 below.

Table 2

|   |   |   |   |   | (5 Phases) |
|---|---|---|---|---|---|
| $k$ | $n$ | Ns | Nr | Step Angle $\theta_0$ | Stator Arrangement |
| 1 | 2 | 2 | 20 | 16 | 2.25 | A C E B D |
| 2 | 1 | 2 | 20 | 18 | 2.0 | A B C D E |
| 3 | 2 | 2 | 20 | 24 | 1.5 | A D B E C |
| 4 | 1 | 3 | 30 | 32 | 1.25 | A B C D E |
| 5 | 2 | 3 | 30 | 26 | 1.0 | A C E B D |

Step angle $\theta_0$ in Table 2 is one for half step drive excitation and is one half the step angle $\theta$ mentioned above.

As is apparent from Table 2, there are more combinations of rotor teeth Nr and stator teeth Ns than in the conventional step motor which employs only the case where the value of $k$ equals 1, thus providing design freedom twice as great as in the conventional motor.

The diagram of FIG. 3 refers to the third case in Table 2 in which $k$ is 2, the number of rotor teeth Nr is 24, number of stator teeth Ns is 20, step angle $\theta_0$ is 1.5° and where the order of excitation phase of magnetic poles 8 is A, B, C, D and E, whereas the magnetic poles 8 are arranged in order of A, D, B, E and C. In the shown state where the rotor tooth of phase A has a center line coinciding with that of an opposing rotor tooth, the center line of the magnetic pole of the rotor tooth opposing to the stator tooth of phase B is 1/5Tr behind that of the opposing stator tooth. In like manner, the center line of the magnetic pole of rotor tooth opposing to the stator tooth of phase C is lagging behind that of the opposing stator tooth by 2/5Tr. On the other hand, the rotor tooth opposing to the stator tooth of phase D is in advance of the opposing stator tooth by 2/5Tr, while the rotor tooth opposing to the stator tooth of phase E is 1/5Tr in advance of the opposing stator tooth.

It will be thus understood from the explanation referring to FIG. 4 that, as the magnetic poles are excited in the order of excitation phases of the respective magnetic poles, the rotor always comes to a stop at a stable position where the center line of the magnetic pole of the excitation phase coincides with that of corresponding rotor teeth thereto and where the maximum displacement of 2/5Tr occurs between the center line of any other magnetic pole and that of corresponding rotor teeth thereto. In this way, the stepped motion of the rotor is continued.

As can be seen from the above explanation, according to the present invention, the number of combinations of the number of rotor and stator teeth is sharply increased by selecting the order in which the excitation windings wound on the magnetic poles of the stator core are arranged without regard to the order of excitation phases. In addition, the number of available step angles $\theta_0$ is increased, thus making it possible to easily achieve the step angle of 1.5° which has so far been considered impossible.

We claim:

1. A step motor of variable reluctance type comprising a stator core, a plurality of magnetic poles wound with a plurality of excitation windings, a rotor core mounted on a rotary shaft, a plurality of rotor teeth equidistantly formed along the outer periphery of said rotor core and a plurality of stator teeth formed along the inner periphery of said magnetic poles; wherein the phase arrangement of the magnetic poles of the stator core satisfies the equation $P(mn \pm [2]k) = Nr$ where $m$ is the number of phases of the excitation windings, P the number of poles for each phse, Nr the number of rotor teeth, n a given integral number, and $k$ is an integral number greater than one, and further the order of phase arrangement of the magnetic poles of the stator core is determined by the value and sign of $k$.

2. A step motor of variable reluctance type according to claim 1, wherein k is 2.

3. A step motor of variable reluctance type comprising a stator core, a plurality of magnetic poles wound with a plurality of excitation windings, a rotor core mounted on a rotary shaft, a plurality of rotor teeth equidistantly formed along the outer periphery of said rotor core and a plurality of stator teeth formed along the inner periphery of said magnetic poles, wherein the phase arrangement and the number of stator teeth satisfy the equation $P(mn \pm k) = Nr$ wherein m is the number of phases of the excitation windings and is five-phase windings, P the number of poles for each phase, Nr the number of rotor teeth, $n$ a predetermined integral number, and $k$ is the integral number 2, the order and phase arrangement of the magnetic poles of the stator core being determined by the value and the sign of $k$, and the order of the phase arrangement of the five-phase excitation winding being different than the order and phase arrangement of the magnetic poles.

4. A step motor of variable reluctance type according to claim 3, wherein said motor comprises five-phase magnetic poles A, B, C, D and E adapted to be respectively excited by five-phase excitation windings, so that when the magnetic pole A is excited and the center line thereof coincides with that of corresponding rotor teeth thereto, each of the center lines of the magnetic poles B and E is out of alignment from those of corresponding rotor teeth thereto by 1/5Tr, and each of the center lines of the magnetic poles C and D is displaced from those of corresponding rotor teeth by 2/5Tr, Tr being the tooth pitch of the rotor.

5. A step motor of variable reluctance type according to claim 3, wherein the sign of $k$ is + and five-phase magnetic poles A, B, C, D and E are provided, said magnetic poles having an order and phase arrangement of ADBEC.

6. A step motor of variable reluctance type according to claim 5, wherein said excitation windings are arranged for excitation in the order ABCDE.

7. A step motor of variable reluctance type according to claim 3, wherein the sign of $k$ is − and five-phase magnetic poles A, B, C, D and E are provided, said magnetic poles having an order and phase arrangement of ACEBD.

* * * * *